Jan. 3, 1967   L. H. MOTT 3RD   3,295,161
EQUIPMENT FOR PRODUCING SYNTHETIC POLYMER FIBERS
Filed March 12, 1965
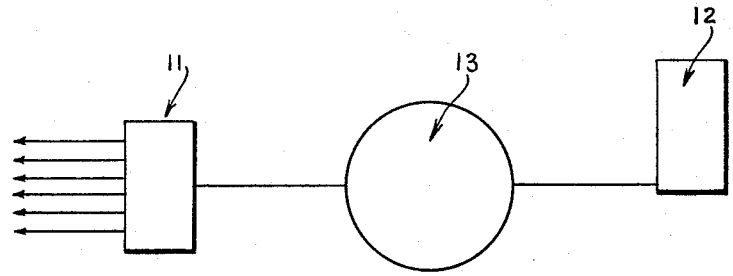
FIG. 1.
FIG. 2.
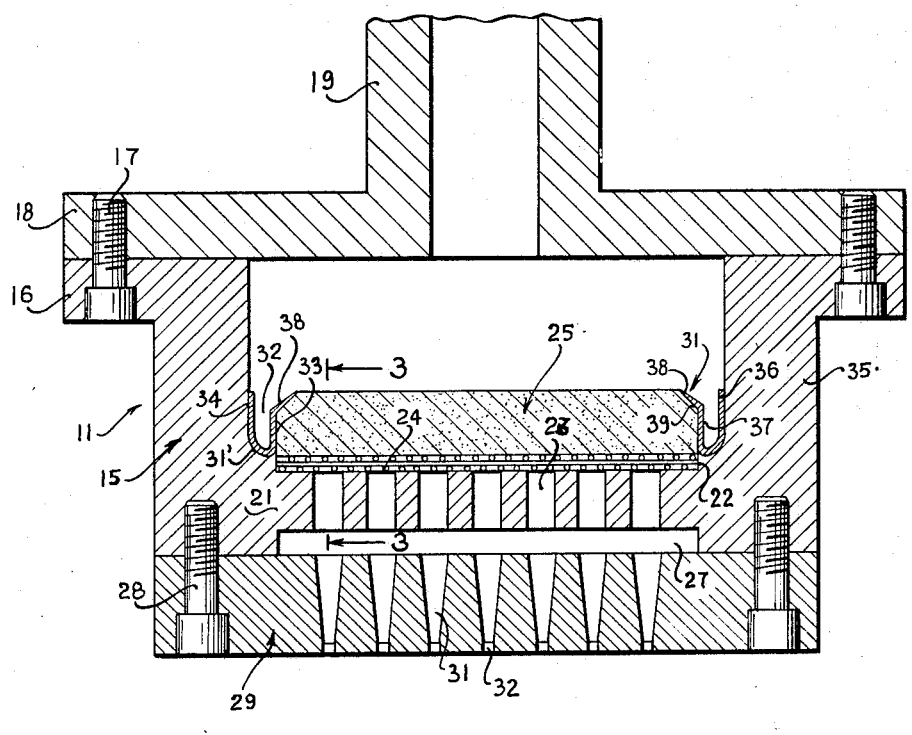
FIG. 3.
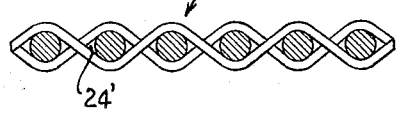
INVENTOR
LAMBERT H. MOTT, 3d
BY
Dean, Fairbank & Hirsch
ATTORNEYS

United States Patent Office 3,295,161
Patented Jan. 3, 1967

3,295,161
EQUIPMENT FOR PRODUCING SYNTHETIC
POLYMER FIBERS
Lambert H. Mott, 3d, Hartford, Conn., assignor to Mott Metallurgical Corp., Hartford, Conn., a corporation of Connecticut
Filed Mar. 12, 1965, Ser. No. 439,248
4 Claims. (Cl. 18—8)

This invention relates to equipment for producing synthetic polymer fibers and more particularly to the extruding portion of such equipment.

As conducive to an understanding of the invention, it is noted that where such extruding portion utilizes a porous disc positioned in a holder between the source of plastic material under pressure and the relatively small perforations or holes through which the plastic is extruded, due to the need for periodic cleaning of the porous disc the latter must be releasably retained in a suitable holder.

Although it is essential that the porous disc be removably retained in its holder to facilitate cleaning of the disc, it is also essential that there be a dependable seal between the periphery of the disc and the adjacent wall of the cup-shaped holder in which it is positioned. The problem of providing a dependable seal is enhanced by the fact that the extrusion pressure on the plastic is relatively high and may be in the order of several thousand p.s.i.

Due to such high pressures involved, the plastic which is heavy and viscous, may be forced around the periphery of the porous disc and since such plastic does not pass through the disc, it would not be homogenized and the resultant agglomerations or lumps would rapidly clog the extrusion openings.

Where a metal O ring which encompasses the rigid disc is used releaseably to retain the porous disc in place and to provide a peripheral seal, as the O ring would have to be forced into the space betwen the periphery of the disc and the wall of the cup-shaped holder for the disc, the hard metal O ring would deform the edge of the disc causing a "flash" that tends to break loose. Consequently, small particles would flow down stream and clog the relatively small holes through which the plastic is extruded.

In addition, as both the O ring and the porous disc which preferably is of stainless steel are relatively hard, the O ring might not dependably engage the disc and the wall of the holder, with resultant presence of small openings through which the plastic would flow due to the high pressures involved.

Where the porous disc is held in place in the cup-shaped holder, by a press fit, close diametral tolerances are required on both the disc and the inner dimension of the holder which adds cost to the fabrication thereof. In addition, due to differences in the coefficient of expansion of the disc and the holder, openings are likely to occur with resultant peripheral leakage.

It is accordingly among the objects of the invention to provide an extrusion head for an equipment for producing synthetic fibers, which may readily be fabricated at relatively low cost and which includes a porous disc for effecting efficient homogenization of the viscous plastic forced therethrough under relatively high pressure and in which the porous disc may readily be removed for cleaning yet in which an effective seal is provided between the disc and the adjacent wall of the holder for the disc to prevent leakage of un-homogenized plastic with resultant clogging of the extrusion openings.

According to the invention, these objects are accomplished by the arrangement and combination of elements hereinafter described and particularly recited in the claims.

In the accompanying drawings in which is shown one of various possible embodiments of the several features of the invention, FIG. 1 is a diagrammatic view of an equipment for producing synthetic fibers, FIG. 2 is a sectional view on an enlarged scale of the extruding head, and FIG. 3 is a detail sectional view of the filter screen taken along line 3—3 of FIG. 2.

Referring now to the drawings, as diagrammatically shown in FIG. 1, the system for producing synthetic fibers comprises an extrusion head 11 which is known in the art as a spinnerette assembly; a melting pot 12 in which the raw plastic from which the fibers are formed is melted and a pump 13 for forcing the molten plastic under relatively high pressure in the order of several thousand p.s.i. into the extrusion head 11.

As shown in FIG. 2, the extrusion head 11 comprises a cup-shaped holder 15, the mouth of which may have an outwardly extending annular flange 16 which is secured as by screws 17 to a complementary annular flange 18 formed at the end of the feed pipe 19 from the pump 13.

The floor 21 of the holder 15 has a circular recess 22 therein with a plurality of relatively large passageways 23 extending parallel to the longitudinal axis of the holder. Positioned in the recess 22 is a circular screen 24 which serves to diffuse the plastic flowing therethrough.

Also positioned in the holder 15 is a rigid porous disc 25 of sintered material and preferably of stainless steel, the diameter of the disc 25 being substantially the same as that of the screen 24.

The undersurface of the floor 21 of the holder 15 has a cylindrical recess 27 aligned with the passageways 23. Secured to the undersurface of the holder 15 as by screws 28 is a rigid plate 29 known in the art as a Spinnerette plate. The plate 29 has a plurality of funnel-shaped passageways 31 therethrough with relatively small diameter outlet ports 32 through which the plastic is forced to form fibers or filaments.

In order securely yet releasably to retain the porous disc in position without likelihood of leakage of the plastic material around the periphery of the disc, an annular sealing member 31 is provided positioned in the annular space 32 between the periphery 33 of disc 25 and the inner wall surface 34 of the side wall 35 of the holder.

As is shown in FIG. 2, the sealing member 31, which preferably is of aluminum, is substantially U-shaped in cross section having a cross piece 31' designed to rest on the floor of the holder 15 adjacent the side wall 35 thereof and side walls 36, 37 adapted to react against the wall surface 34 and the periphery 33 of the disc 25.

The free end of side wall 37 of the sealing member 31 has an inwardly extending annular lip 38 which extends upwardly at an angle of approximately 45 degrees from the horizontal and is designed to seat on the correspondingly beveled upper edge 39 of porous disc 25.

In the operation of the equipment above described, the molten plastic which is heavy and viscous, will be forced by pump 13 under a pressure of several thousand p.s.i. through feed pipe 19 into the cup-shaped holder 15 and as a result such fluid plastic will be forced through the porous disc 25 which will filter the plastic and also homogenize the same. To facilitate flow of the plastic from the disc 25 into the passageways 23, the diffuser screen is provided. By reason of the porous screen, blinding is prevented of a large portion of the undersurface of the porous disc which would occur if the disc 25 rested directly against the floor 21 of the holder 15.

The plastic will not only flow vertically through the screen 24, but will also flow laterally through the spaced 24' between the fibers from which the screen is formed thereby spreading the plastic over the entire floor of the holder 15 to insure maximum flow through passageways 23.

Thereupon, the plastic under pressure will flow through the funnel-shaped passageways in plate 29 to be forced through the small diameter ports 32 in the form of fibers or filaments or size dependent upon the diameter of said ports.

By reason of the U-shaped cross section of the sealing member 31, the pressure on the plastic material will move the side walls 36, 37 thereof outwardly to engage the wall surface 34 and the periphery 33 of the disc. In addition, such plastic under pressure will react against the lip 38 and force the latter against beveled edge 39 of the porous disc.

As the porous disc 25 and the holder 15 are of harder metal than the aluminum sealing member 31, the walls 36, 37 will deform slightly dependably to engage wall surface 34 and the periphery 33 of the disc to provide dependable seals at such regions even if there are slight irregularities in the engaging surfaces.

Similarly, the lip 38 will deform slightly to engage the beveled edge 39 of the porous disc to provide a dependable seal at such region.

The sealing effect is enhanced with pressure increase, thereby dependably preventing leakage even under extreme operating conditions.

To remove the disc for cleaning, after the plate 29 is removed by unloosening screws 28, it is merely necessary to first dissolve or burn out the plastic in the holder and then force a knockout pin from the downstream side of the holder through the passageways 23. As the sealing member is of relatively soft aluminum it will readily be displaced and in the event there is any difficulty, the assembly can be immersed in a suitable solution to dissolve the thin walls of the seal for ready removal of the disc.

With the construction above described, an extruding head assembly may be provided which will insure dependable filtering and homogenization of the plastic yet which may readily be dissembled for removal of the porous disc and which will operate without likelihood of leakage even under high pressures.

As many changes could be made in the above equipment and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An extrusion head for producing synthetic fibers comprising a cup-shaped holder having a mouth defining an inlet and having a side wall and a floor, said floor having a plurality of passageways therethrough, a rigid disc of porous material positioned in said holder in juxtaposition to said floor, said disc having a beveled outer edge, and an annular sealing member substantially U-shaped in cross section positioned in said holder between the wall thereof and the side wall of said disc, the concavity of said sealing member being directed toward said inlet, the inner wall of said U-shaped sealing member having an inwardly extending annular lip adapted to seat on said beveled edge.

2. The combination set forth in claim 1 in which a diffuser screen is interposed between said disc and the floor of said holder.

3. The combination set forth in claim 1 in which said annular lip is directed toward said inlet at an angle of approximately 45 degrees and said disc edge has a complementary bevel angle.

4. The combination set forth in claim 1 in which said porous disc is of sintered stainless steel and said sealing member is of aluminum.

References Cited by the Examiner
UNITED STATES PATENTS

| | | | |
|---|---|---|---|
| 2,266,368 | 12/1941 | Hull et al. | 18—8 |
| 3,028,627 | 4/1962 | McCormick | 18—8 |
| 3,104,419 | 9/1963 | LaForge | 18—8 |

FOREIGN PATENTS

| | | |
|---|---|---|
| 1,228,424 | 3/1960 | France. |
| 780,743 | 8/1957 | Great Britain. |

WILLIAM J. STEPHENSON, *Primary Examiner.*